United States Patent [19]
Nakase et al.

[11] Patent Number: 6,120,335
[45] Date of Patent: Sep. 19, 2000

[54] CATALYTIC EXHAUST SYSTEM FOR WATERCRAFT

[75] Inventors: Ryoichi Nakase; Shigeyuki Ozawa, both of Shizuoka, Japan

[73] Assignee: Yamaha Hatsudoki Kabushiki Kaisha, Japan

[21] Appl. No.: 09/235,057

[22] Filed: Jan. 20, 1999

Related U.S. Application Data

[63] Continuation-in-part of application No. 08/698,043, Aug. 15, 1996, Pat. No. 5,954,553.

[30] Foreign Application Priority Data

Jan. 20, 1998 [JP] Japan .................................. 10-008559

[51] Int. Cl.$^7$ .................................................. B63H 21/10
[52] U.S. Cl. ................................................ 440/88; 440/88
[58] Field of Search ......................... 440/88, 89; 60/320, 60/322

[56] References Cited

U.S. PATENT DOCUMENTS

| | | | |
|---|---|---|---|
| 4,900,282 | 2/1990 | Takahashi et al. | 440/89 |
| 5,100,351 | 3/1992 | Shibata | 440/89 |
| 5,324,217 | 6/1994 | Mineo | 440/89 |
| 5,366,401 | 11/1994 | Nanami et al. | 440/89 |
| 5,425,232 | 6/1995 | Holtermann | 440/89 |
| 5,554,057 | 9/1996 | Abe et al. | 440/89 |
| 5,562,509 | 10/1996 | Nakase et al. | 440/89 |
| 5,632,660 | 5/1997 | Nakase et al. | 440/89 |
| 5,702,276 | 12/1997 | Nakase et al. | 440/898 |
| 5,788,547 | 8/1998 | Ozawa et al. | 440/89 |

*Primary Examiner*—Jesus D. Sotelo
*Attorney, Agent, or Firm*—Knobbe, Martens, Olson & Bear, LLP

[57] ABSTRACT

A personal watercraft includes a catalytic exhaust system in order to reduce discharge of pollutants. The exhaust system includes an exhaust passage and a catalyzer that is located within an expansion chamber of the exhaust passage. A water jacket is provided adjacent the expansion chamber and a portion of water from the water jacket merges with the exhaust pipe at a merge point downstream from the catalyzer. The distance within the exhaust passage between an exhaust port of a combustion chamber and the front of the catalyzer and from the rear of the catalyzer to the coolant-exhaust merge point is such that a pressure wave from the combustion chamber reflects back from downstream of the catalyzer carries an exhaust/water mixture from the merge point upstream across the catalyst, thereby cooling the catalyzer. Also, an insertion port disposed in the exhaust system upstream of the catalyzer injects cooling water into the exhaust system, thus cooling the exhaust gases and the catalyzer.

28 Claims, 12 Drawing Sheets

CATALYTIC EXHAUST SYSTEM FOR WATERCRAFT

RELATED APPLICATION

This application is a continuation-in-part of U.S. patent application Ser. No. 08/698,043, filed on Aug. 15, 1996, U.S. Pat. No. 5,954,553 in the name of Shigeyuki Ozawa, Ryoichi Nakase and Hiroaki Fujimoto, and assigned to the assignee of the present application. This application also claims the benefit of Japanese Patent Application No. 10-8559, filed Jan. 20, 1998 under the provisions of 35 U.S.C. § 119.

BACKGROUND OF THE INVENTION

1. Field of the Invention

This invention relates to an exhaust system for a personal watercraft and more particularly to a catalytic exhaust system for such a watercraft.

2. Description of Related Art

Personal watercraft have become very popular in recent years. This type of watercraft is quite sporting in nature and carries a rider and possibly one or two passengers. A relatively small hull of the personal watercraft commonly defines a riders' area above an engine compartment. A two-cycle internal combustion engine frequently powers a jet propulsion unit which propels the watercraft. The engine lies within the engine compartment in front of a tunnel formed on the underside of the watercraft hull. The jet propulsion unit is located within the tunnel and is driven by a drive shaft. The drive shaft usually extends between the engine and the jet propulsion device, through a wall of the hull that forms a front gullet portion of the tunnel.

An exhaust system of the personal watercraft discharges engine exhaust to the atmosphere either through or close to the body of water in which the watercraft is operating. Although submerged discharge of engine exhaust silences exhaust noise, environmental concerns arise. These concerns are particularly acute in connection with two-cycle engines because engine exhaust from two-cycle engines often contains lubricants and other hydrocarbons.

Such environmental concerns have raised a desire to reduce exhaustion of hydrocarbons and other exhaust byproducts (e.g., carbon monoxide and oxides of nitrogen) and thus reduce pollution of the atmosphere and the body of water in which the watercraft is operated. In response to the increased concerns regarding exhaust emissions, it has been proposed to equip personal watercraft with a catalyst to convert exhaust byproducts to harmless gases.

The nature of watercraft exhaust systems has a tendency to impair the efficiency of or cause damage to the catalyst. Catalysts must operate at a relatively high temperature in order to produce the necessary thermal reaction and burning of exhaust byproducts. Peak catalyst efficiency is achieved within a range of temperatures. Operation at either too high or too low of a temperature can cause the catalyst to lose efficiency and operation at too high of a temperature can even damage the catalyst. In certain circumstances, for instance when an engine fails to fire the cylinders, the catalyst is often excessively heated by unburned fuel that is discharged to the exhaust pipe and then burned in the catalyst. This excessive heat could cause inefficiency in the operation of the catalyst or damage the catalyst. Often, a watercraft exhaust pipe will have a water jacket disposed thereon to cool the exhaust system and catalyst. However, this water jacket only indirectly cools the catalyst. This indirect cooling is may not be sufficient to keep the catalyst from overheating under some operating conditions.

Also, the sporting nature of a personal watercraft subjects the catalyst to damage. It is likely that water will occasionally flow upstream through the exhaust system of the watercraft, especially if the watercraft becomes inverted and is subsequently righted. If a sudden rush of water comes in contact with the catalyst, the catalyst bed can become polluted, particularly when operating in marine environments, and can even shatter.

SUMMARY OF THE INVENTION

A need therefore exists for a personal watercraft exhaust system in which an overheating catalyst can be detected and effectively cooled. Such a cooling system lowers the temperature of the catalyst so that the catalyst operates in its most effective range of temperatures and avoids overheating.

Thus, an aspect of the present invention involves a watercraft comprising an internal combustion engine enclosed within a hull of the watercraft. The engine has at least one exhaust port and an output shaft which drives the propulsion device. An exhaust system extends between the engine exhaust port and a discharge port and includes a catalyzer to treat exhaust gases from the engine before discharge through the discharge port. A coolant port of a cooling system opens into the exhaust passage at a point upstream of the catalyzer.

In accordance with another aspect of the present invention, a method for cooling a catalyzer in the watercraft exhaust system is provided and comprises the step of injecting water into the exhaust system at a point upstream of the catalyzer.

An additional aspect of the present invention involves a watercraft comprising an internal combustion engine having at least one exhaust port and an output shaft which drives a propulsion device. The watercraft has an exhaust system which includes an exhaust passage that extends between the engine exhaust port and a discharge port. The exhaust system further comprises an expansion chamber portion having a converging portion at the downstream end thereof. A catalyzer is disposed in the expansion chamber. A coolant-exhaust merge point is defined in the exhaust passage at a point downstream of the catalyzer. The catalyzer is sufficiently close to the coolant-exhaust merge point so that exhaust gas pressure pulses reflecting from downstream of the catalyzer carry at least a portion of the exhaust/coolant mixture from the merge point upstream in the exhaust passage and across the catalyzer.

Further aspects, features and advantages of the present invention will become apparent from the detailed description of the preferred embodiments which follows.

BRIEF DESCRIPTION OF THE DRAWINGS

These and other features of the invention will now be described with reference to the drawings of preferred embodiments of the present watercraft exhaust system. The illustrated embodiments of the watercraft exhaust system are intended to illustrate, but not to limit, the invention. The drawings contain the following figures.

DETAILED DESCRIPTION OF PREFERRED EMBODIMENTS OF THE INVENTION

Several embodiments of an improved exhaust system with a catalyzer are disclosed herein. Each of these embodiments employ the same basic concept characteristic of cooling the catalyzer, at least under some conditions, with atomized and/or vaporized coolant (e.g., water). In some modes this is done by utilizing a reflected pressure wave to carry the coolant back through the catalyzer, while in other modes the coolant is introduced upstream of the catalyzer. And this cooling feature can continuously operate at all times when the engine is running, or can be employed only when the temperature of the catalyzer or the exhaust system exceeds an upper temperature limit. It will be understood, however, that these and various other aspects of the embodiments described below can be present individually or in combination in a watercraft. In addition, like reference numerals have been used with each embodiment to identify common components. Thus, unless otherwise indicated, the following description of common components should apply equally to all embodiments.

Figure 1:
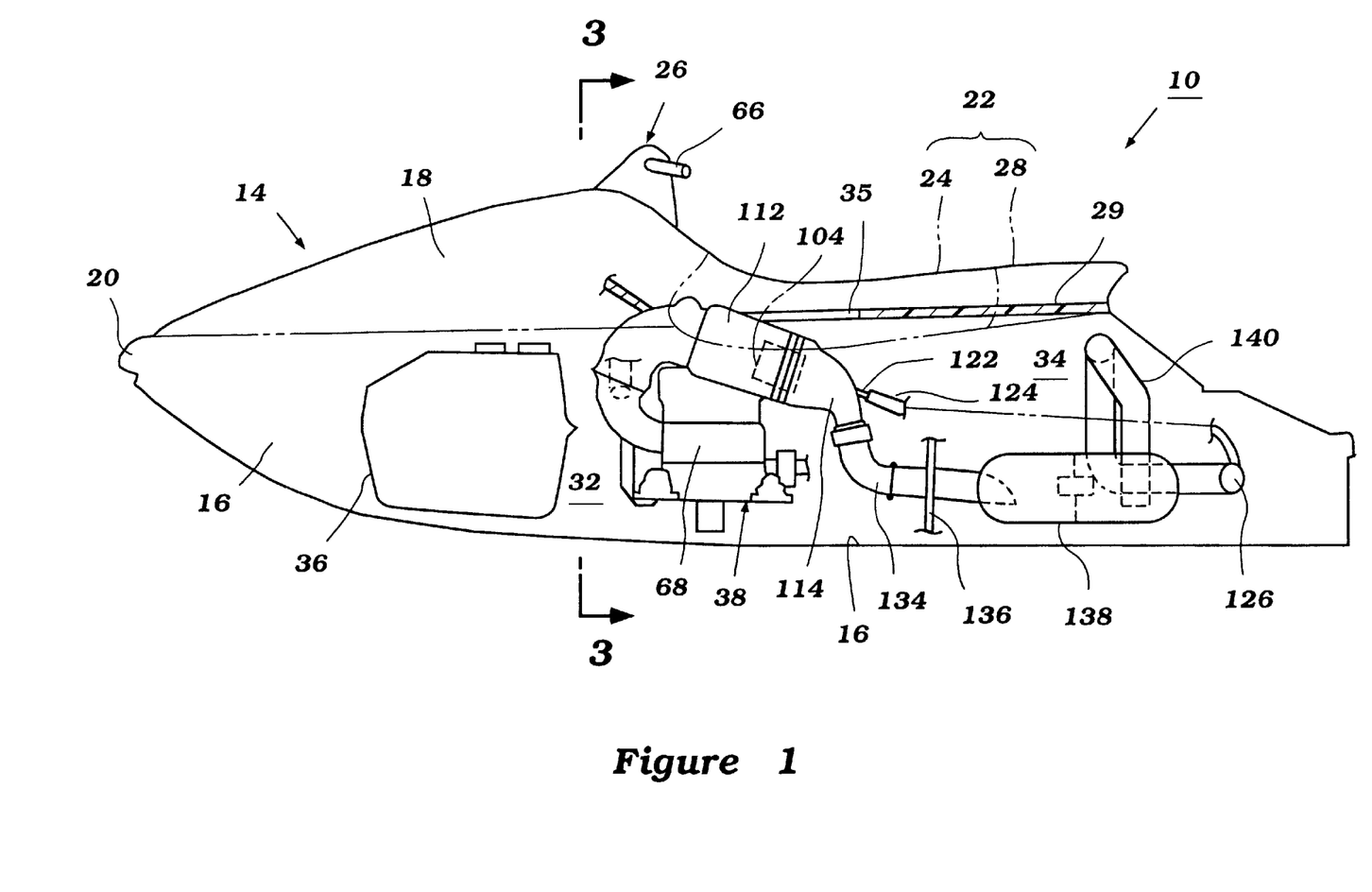
FIG. 1 is a side elevational view, with a portion broken away, of a personal watercraft with a catalytic exhaust system constructed in accordance with a preferred embodiment of the invention.
Figure 2:
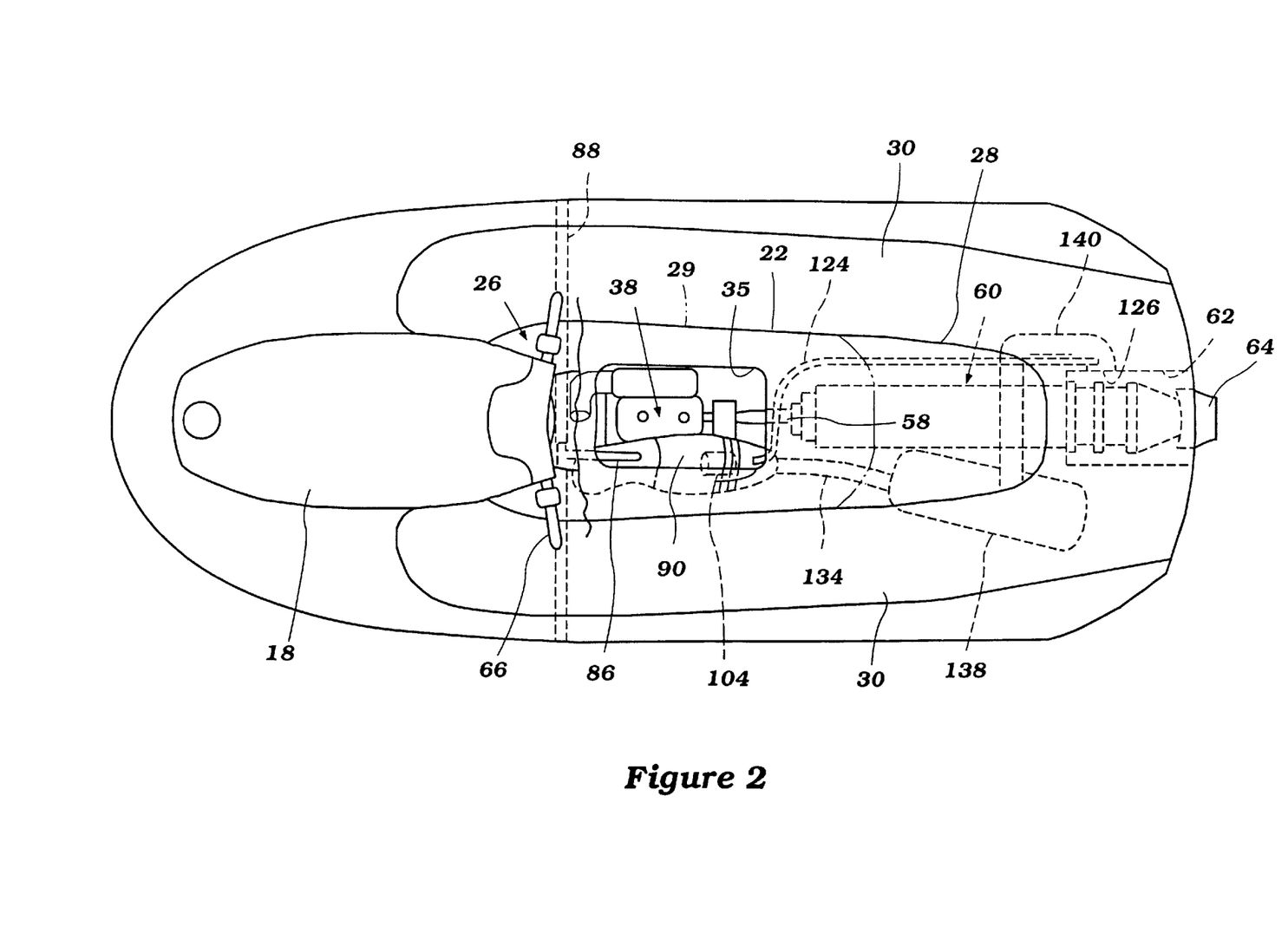
FIG. 2 is a top plan view of the watercraft of FIG. 1.

FIGS. 1 and 2 illustrate a personal watercraft 10 which includes a catalytic exhaust system 12 configured in accordance with a preferred embodiment of the present invention. Although the present exhaust system 12 is illustrated in connection with a personal watercraft 10, the exhaust system 12 can be used with other types of watercraft as well, such as, for example, but without limitation, small jet boats and the like.

The watercraft 10 includes a hull 14 formed by a lower hull section 16 and an upper deck section 18. The hull sections 16, 18 are formed from a suitable material such as, for example, a molded fiberglass reinforced resin. The lower hull section 16 and the upper deck section 18 are fixed to each other around the peripheral edges 20 in any suitable manner.

A passenger seat 22 is provided proximate to the stem of the hull 14. The passenger seat 22 is mounted longitudinally along the center of the watercraft 10. In the illustrated embodiment, the seat 22 has a longitudinally extended straddle-type shape which may be straddled by an operator and by at least one or two passengers. A forward end 24 of the seat 22 lies proximate to the controls 26 of the watercraft 10 which generally lie at about the longitudinal center of the watercraft 10. This position of the operator on the watercraft 10 gives the watercraft fore and aft balance when the operator rides alone. A rear portion 28 of the seat 22 is configured to allow one or two passengers to be comfortably seated behind the operator of the watercraft 10. The front and rear portions 24, 28 of the seat 22 desirably are padded to increase the comfort of the operator and the passengers.

A pedestal 29 supports the seat 22 at a desired height on the hull 14. The pedestal 29 is integrally formed into the upper deck section 18. At least the front section 24 of the seat 22 is removably secured to the pedestal 29. A latch or similar convenient coupling releasably secures at least the front section 24 of the 22 to the pedestal 29. As understood from FIG. 1, the sides of both the front and rear portions 24, 28 of the seat 22 wrap around the sides of the pedestal 29 to enhance the comfort of the seat 22, as known in the art.

Figure 3:
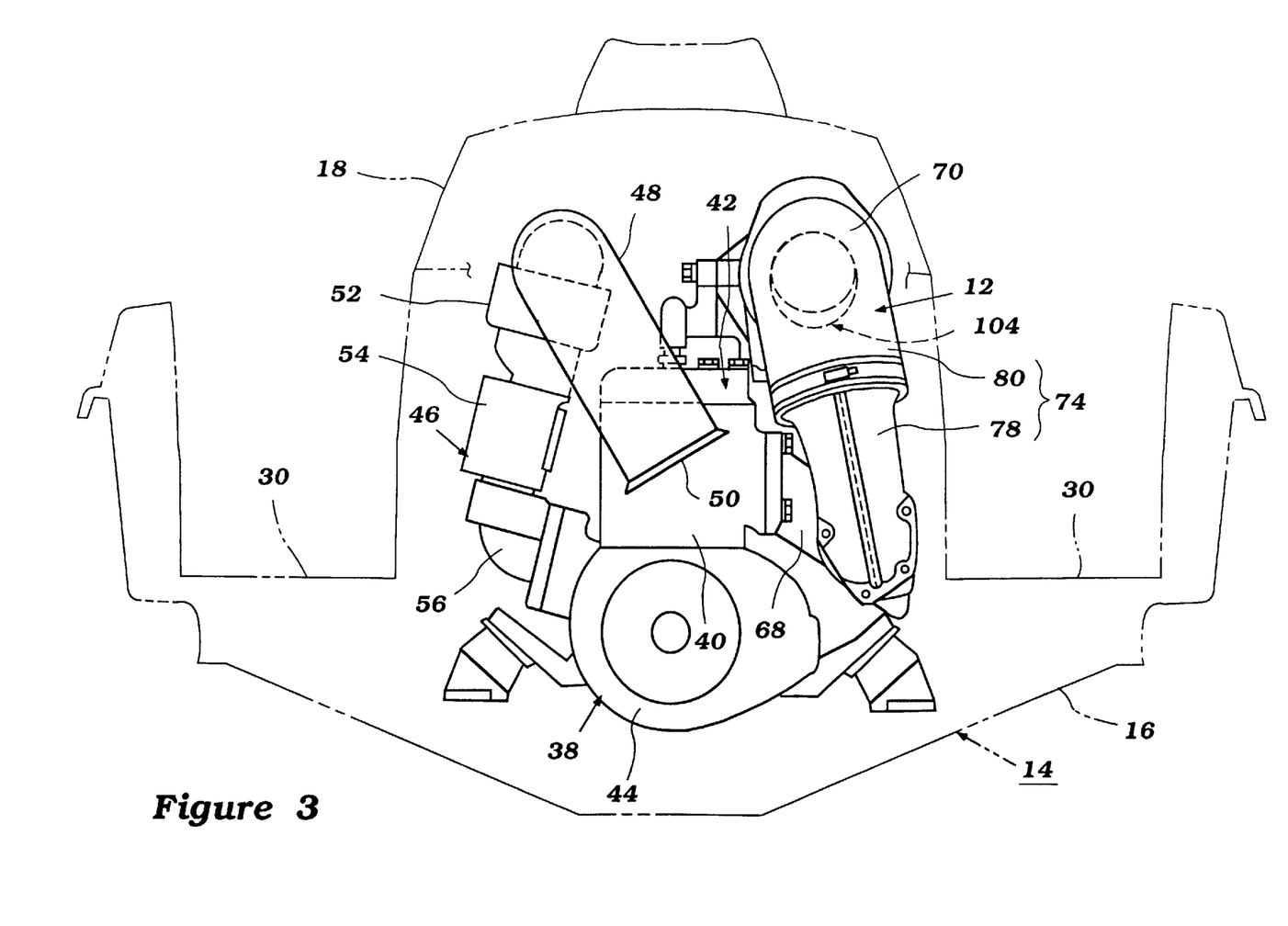
FIG. 3 is an enlarged cross-sectional view taken along the line 3—3 of FIG. 1, with the hull shown in phantom.

With reference to FIGS. 2 and 3, the upper deck section 18 of the hull 14 advantageously includes foot areas 30. The foot areas 30 extend generally longitudinally and parallel to the sides of the elongated seat 22 so that the operator and any passengers sitting on the seat 22 can place their feet in the foot areas 30. A non-slip surface (not shown) is located in the foot areas 30 to provide increased grip and traction for the operator and the passengers.

The lower hull section 16 of the personal watercraft 10 includes a forward compartment 32 and a rear compartment 34. The rear compartment 34 lies below the pedestal 29. An opening 35 is formed in the pedestal 29 to provided access into the pedestal 29. In the illustrated embodiment, the access opening 35 is located beneath the front portion 24 of the seat 22, near the watercraft controls 26.

In the exemplary watercraft depicted in FIG. 1, a fuel tank 36 and a buoyant block (not illustrated) are located in the forward compartment 32. The buoyant block affords additional buoyancy to the watercraft 10.

An internal combustion engine 38 powers the watercraft 10. The engine 38 is contained within the rear compartment 34 and is mounted primarily beneath the forward portion of the seat 22. Engine mounts secure the engine 38 to the hull lower portion 16 in a known manner.

In the illustrated embodiment, the engine 38 includes two in-line cylinders and operates on a two-stroke crankcase compression principle. This engine type, however, is merely exemplary. Those skilled in the art will readily appreciate that the present exhaust pipe cooling system can be used with any of a variety of engine types having other number of cylinders, having other cylinder arrangements and operating on other combustion principles (e.g., four-stroke principle).

As best seen in FIG. 3, a cylinder block 40 and a cylinder head assembly 42 desirably form the cylinders of the engine 38. Pistons reciprocate within the engine 38 and drive an output shaft, such as a crankshaft, in a known manner. The crankshaft desirably is journaled with a crankcase 44, which in the illustrated embodiment is located beneath the cylinder block 40.

A conventional induction system 46 supplies a fuel/air charge to a plurality of crankcase chambers formed within the crankcase 40. The induction system 46 is disposed at one side of the engine 38 on one side of a longitudinally extending center plane.

As best seen in FIGS. 2 and 3, the induction system 46 includes an air inlet device 48 which has a downwardly facing opening 50. The air inlet device 48 supplies air to a plenum chamber 52 which extends along the inlet side of the engine 38. The plenum chamber 52 communicates with at least one charge former 54 that in turn delivers the fuel-air charge to an intake manifold 56. The charge former 54 receives fuel through a conventional fuel delivery system that draws fuel from the fuel tank 36.

The intake manifold 56 is mounted to a side of the crankcase member 44 and communicates with each crankcase chamber. The crankcase chambers of the engine 38 are sealed from one another with each crankcase chamber communicating with a dedicated combustion chamber. The combustion chamber is defined between the corresponding cylinder bore, piston and cylinder head. Because the internal details of the engine 38 desirably are conventional, a further description of the engine construction is not believed necessary to understand and practice the invention.

As seen in FIG. 2, a coupling interconnects the engine crankshaft to an impeller shaft 58. If the engine output shaft is vertically disposed, the impeller shaft 58 will be driven through a bevel gear transmission or a similar transmission. The propeller shaft 58 extends rearwardly to a jet propulsion unit 60 and drives an impeller of the unit 60.

The jet propulsion unit 60 is positioned in a tunnel 62 in the rear center of the lower hull section 16. The rotating impeller, which the impeller shaft 58 drives, pressurizes the water within the unit 60 and forces the pressurized water through the nozzle section of the propulsion unit 60. A steering nozzle 64 directs the exit direction of the water stream exiting the jet propulsion unit 60. The steering nozzle 64 is pivotally supported at the rear of the jet propulsion unit 60 to change the thrust angle on the watercraft 10 for steering purposes as is known in the art.

The steering nozzle 64 is connected to a steering handle 66. The steering handle 66 forms part of the operator controls 26 which are mounted in front of the operator seat 22 as noted above. The steering handle 66 also can include a throttle control for controlling the speed of the engine 38.

The propulsion unit 60 supplies cooling water through a conduit (not shown) to an engine cooling jacket. The engine cooling jacket extends through cylinder block 40, about the cylinders, and through the cylinder head assembly 42. The cylinder head 42 includes a coolant discharge port through which the cooling water exits the engine 38, as described below.

The engine 38 and propulsion device 60 so far described are conventional and represent only an exemplary propulsion mechanism for the watercraft 10. A further description of these components of the personal watercraft 10 therefore is not believed necessary for an understanding and an appreciation of the present exhaust system.

The exhaust system 12 discharges exhaust byproducts from the engine 38 to the atmosphere and/or to the body of water in which the watercraft 10 is operated. As best seen in FIGS. 1 through 3, the exhaust system 12 includes an exhaust manifold 68 that is affixed to the side of the cylinder block 40 and which receives exhaust gases from the combustion chambers through exhaust ports in a well-known manner.

An outlet end of the exhaust manifold communicates with a C-shaped pipe section 70. This C-pipe 70 includes a C-shaped inner tube 72 that communicates directly with the discharge end of the exhaust manifold 68. An outer tube 74 surrounds the inner tube 72 to form a water jacket 76 between the inner and outer tubes 72, 74. The water jacket 76 communicates with the discharge port of engine water jacket.

The outer tube 74 is formed by upper and lower sections 78, 80. A flexible coupling 82 connects together the sections 78, 80 so as to permit expansion and contraction between the sections 78, 80 and accommodate thermal variations. The coupling 82 tightly holds together the upper and lower sections 78, 80 to prevent leakage from the water jacket 76.

The upper section 80 of the outer tube 74 includes a port 84 which communicates with a conduit 86. A portion of the coolant flow through the water jacket 76 is diverted into the conduit 86. The conduit 86 in turn communicates with a discharge line 88 in order to discharge the cooling water to the body of water in which the watercraft 10 is operated. In the illustrated embodiment, as seen in FIG. 2, the outlets to the discharge line 88 lie on either side of the watercraft hull 14 to act as a telltale indicator, exhibiting proper function of the engine cooling system.

Figure 4:
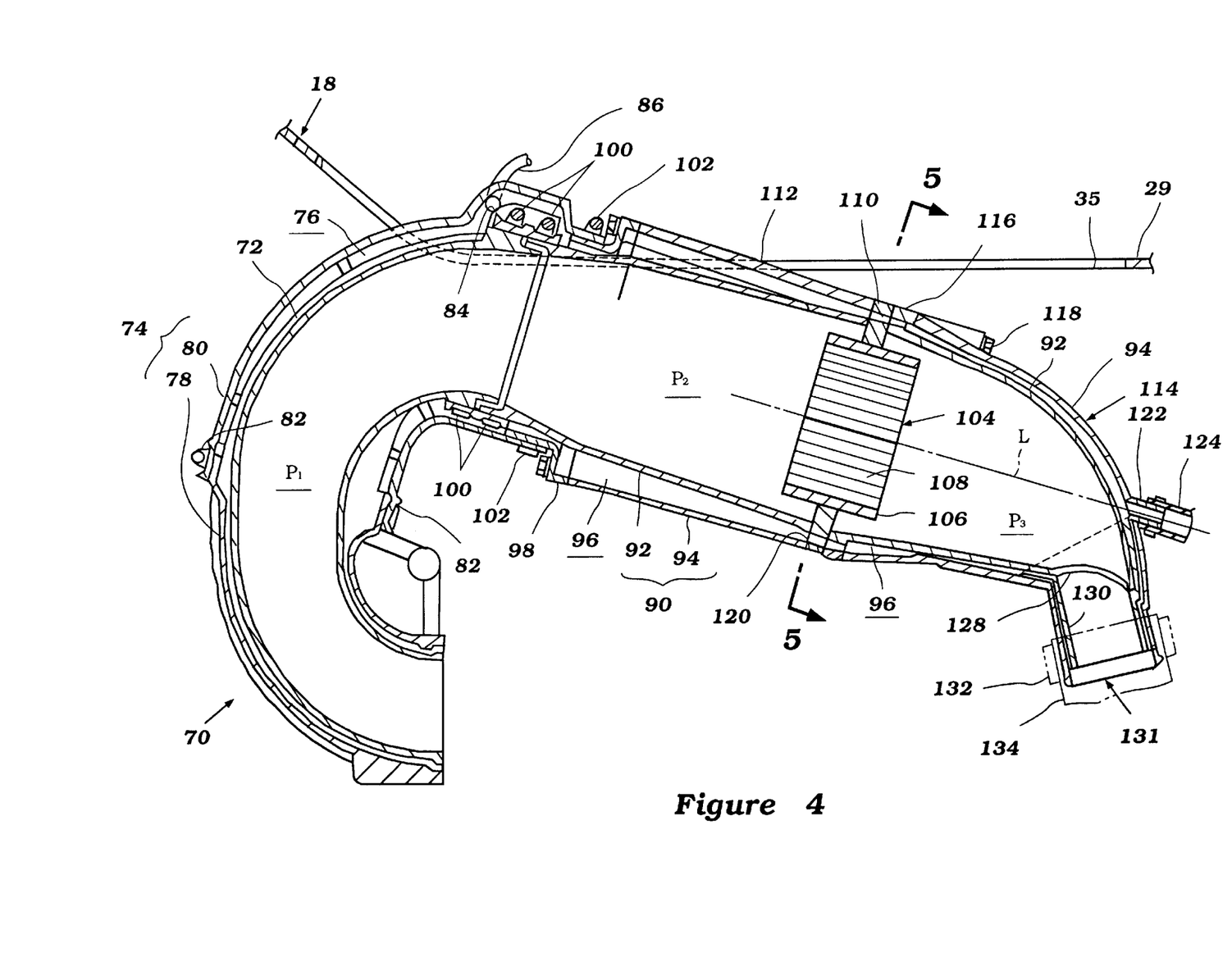
FIG. 4 is an enlarged cross-sectional view taken through the exhaust system of FIG. 1.

The outlet end of the C-pipe 70 communicates with an expansion chamber 90. The expansion chamber 90 has a dual shell construction formed in part by an inner shell 92 which defines an expansion chamber volume. An outer shell 94 surrounds the inner shell 92 and defines a cooling jacket 96 about the inner shell 92 with a header 98 connecting together the inner and outer shells 92, 94.

An inner flexible coupling 100 connects together an inner portion of the header 98 with an outlet end of the C-pipe inner tube 72. A flow passage $P_1$ through the inner tube 72 communicates with an upper portion $P_2$ of the expansion chamber 90.

An outer flexible coupling 102 similarly connects together an outer portion of the header 98 with an outlet end of the C-pipe outer-upper section 80. In this manner, the water jacket 96 of the expansion chamber 90 communicates with the water jacket 76 of the C-pipe 70 to receive cooling water from the engine 38.

The expansion chamber 90 desirably houses a catalyzer 104. In the illustrated embodiment, the catalyzer 104 includes an annular shell 106 supporting a honeycomb-type catalyst bed 108. The catalyst bed 108 is formed of a suitable catalytic material such as that designed to treat and render harmless hydrocarbons, carbon monoxide, and oxides of nitrogen.

An annular flange 110 supports the annular shell 104 generally at the center of the flow path L through the expansion chamber volumes. In this manner, all exhaust gas flow through the expansion chamber 90 passes through the catalyst bed 108.

In the illustrated embodiment, the annular flange 110 is held between upper and lower sections 112, 114 of the expansion chamber 90. Each section 112, 114 of the expansion chamber 90 includes the dual shell construction described above. A header 116 interconnects the inner and outer shells 92, 94 of the expansion chamber lower section 114.

Fasteners 118 releasably join together the upper and lower sections 112, 114, with the flange 110 interposed therebetween. The fasteners 118 desirably can be removed in order to separate the sections 112, 114 of the expansion chamber 90 in order to service or clean the catalyst bed 108. In the illustrated embodiment, the fasteners 118 are bolts that pass through aligned holes in the lower expansion chamber section 114 and the flange 110, and thread into corresponding threaded holes in the upper expansion chamber section 112; however, other types of releasable couplings also can be used to connect the upper and lower expansion chamber sections 112, 114.

Figure 5:
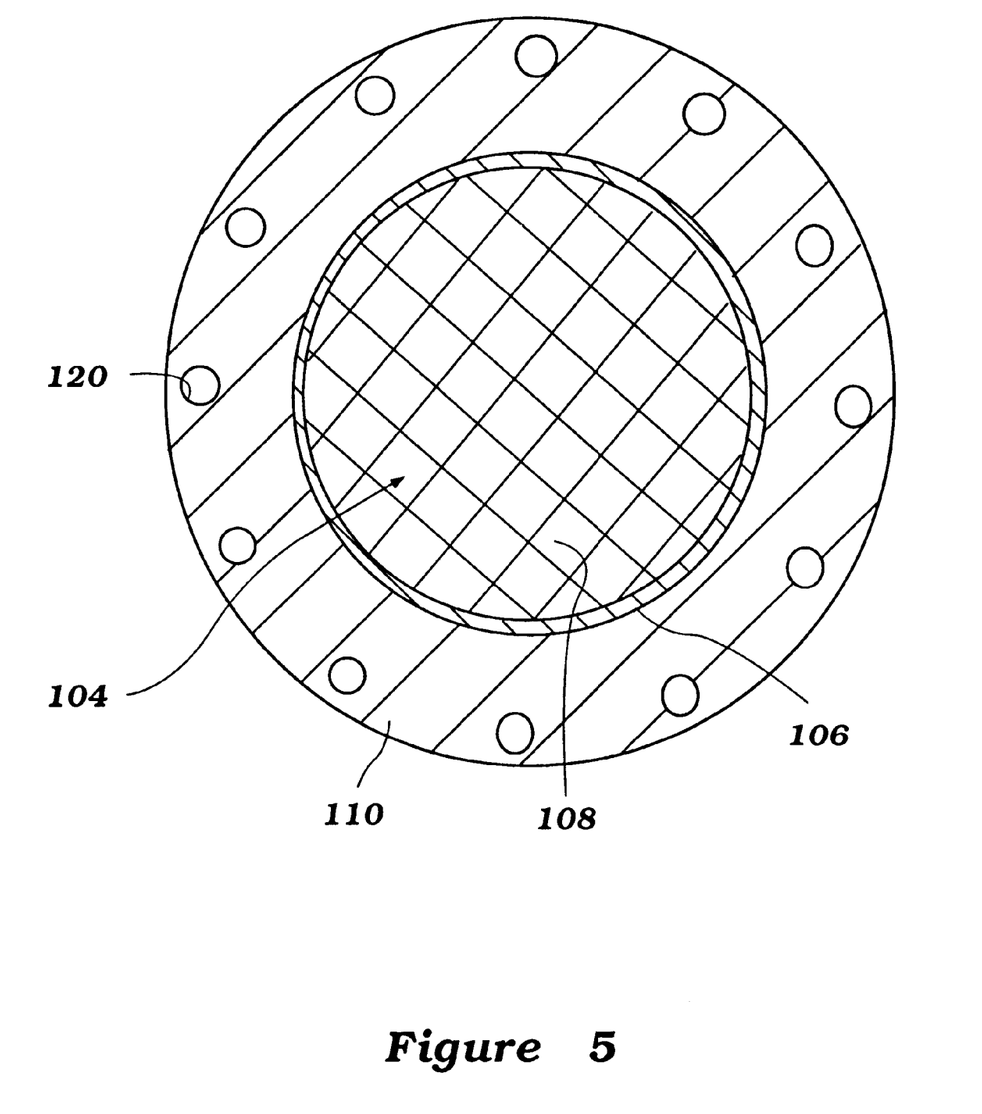
FIG. 5 is a further enlarged cross-sectional view taken along the line 5—5 of FIG. 4 and shows the catalyst bed and its mount.

As seen in FIGS. 4 and 5, the annular flange 110 also includes a plurality of apertures 120 which place the cooling jackets 96 of the upper and lower sections 112, 114 of the expansion chamber 90 in communication with each other.

The water jacket 96 of the upper section 112 receives cooling water from the water jacket 76 of the C-pipe 70. The lower section 114 of the expansion chamber 90 also includes a discharge port 122. The discharge port 122 is positioned just upstream of the discharge end of the expansion chamber 90. The port 122 also extends in a direction that is generally co-axial with the flow axis L through the expansion chamber 90. In this position, a portion of the cooling water flowing through the expansion chamber water jacket 96 flows through a discharge line 122 rather than through the exhaust pipe.

A discharge conduit 124 is connected to the port 122. As seen in FIG. 2, the conduit 124 extends rearwardly to a discharge end 126 of the exhaust system 12. In this manner, cooling water which is discharged through the conduit is introduced back into the body of water in which the watercraft 10 is operated.

With reference back to FIG. 4, the lower section 114 of the expansion chamber 90 converges to an opening 128 that leads to a discharge pipe 130. The discharge pipe 130 also has a dual shell construction with an inner tubular portion stopping short of an outer tubular portion. In this manner, the water flow through the water jacket 96 merges with the exhaust gas flow through the expansion chamber volume $P_3$ at a coolant-exhaust merge point 131 downstream of the catalyzer 104.

A conventional coupling 132 releasably connects a flexible pipe 134 to the discharge end 130 of the expansion chamber 90. As seen in FIGS. 1 and 2, the flexible pipe 134 extends rearwardly through a bulk head 136 of the rear compartment 34 and along one side of the watercraft hull tunnel 62. The flexible pipe 134 connects to an inlet section of a water trap device 138. The water trap device 138 also lies within the watercraft hull 16 on the same side of the tunnel 62.

The water trap device 138 has a sufficient volume to retain water and to preclude the back flow of water to the expansion chamber 90 and the engine 38. Internal baffles within the water trap device 138 help control water flow through the exhaust system 12.

An exhaust pipe 140 extends from an outlet section of the water trap device 138 and wraps over the top of the tunnel 62 to the discharge end 126 of the exhaust system 12. The discharge end 126 desirably opens into the tunnel 62 at an area that is close to or actually below the water level with the watercraft 10 floating at rest on the body of water.

Figure 6:
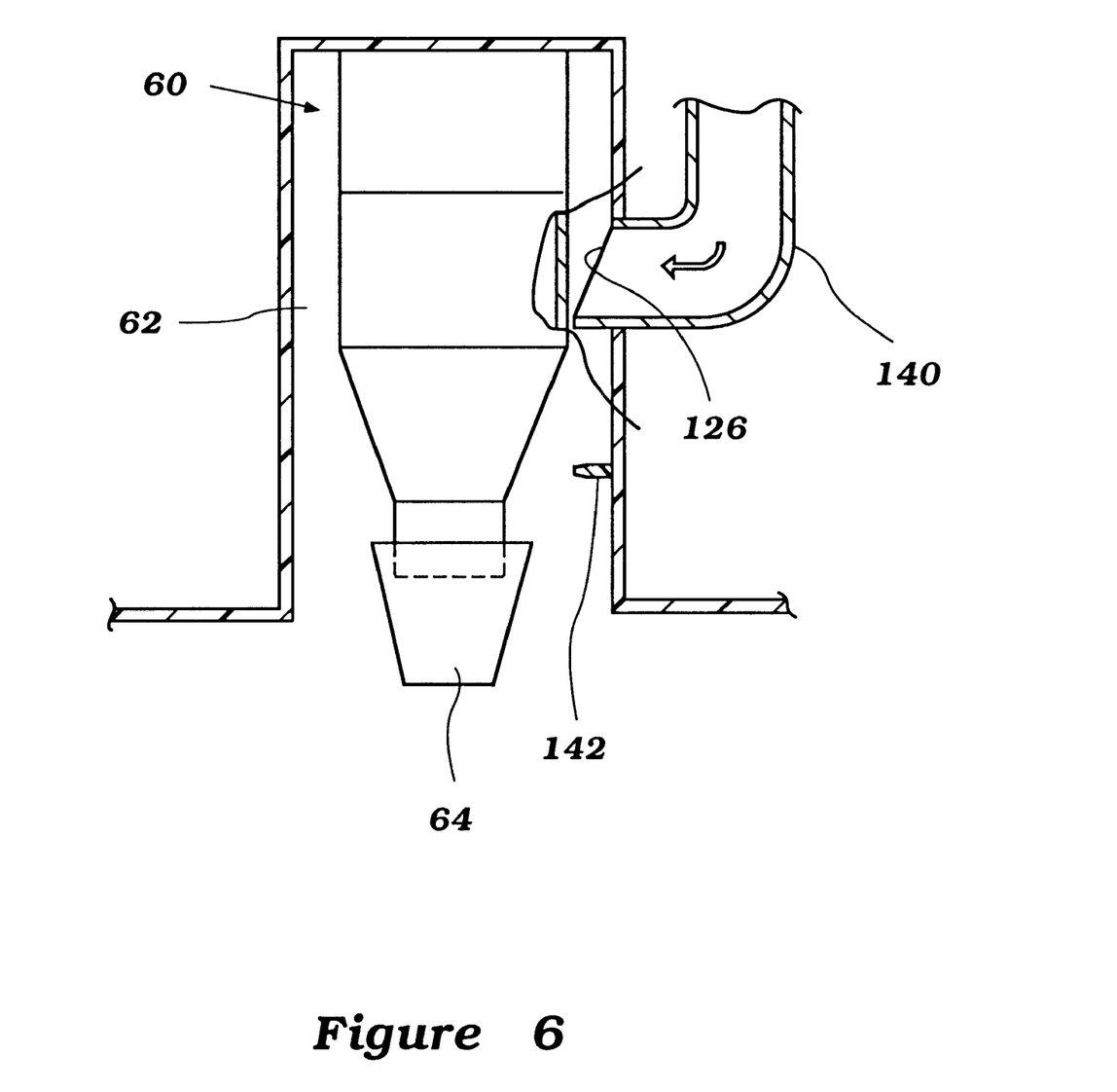
FIG. 6 is a top cross-sectional view of a portion of the tunnel and jet propulsion unit of the watercraft of FIG. 1.

With reference also to FIG. 6, the discharge end 126 opens into the tunnel 62 through a sidewall thereof. A sound insulation wall 142 is disposed on the tunnel 62 sidewall downstream of the discharge end 126. Exhaust gases and sound emanating from the discharge end 126 are baffled by the sound insulation wall 142 as they move rearwardly through the tunnel 62.

After combustion, exhaust gases exit the combustion chamber through an exhaust port which opens into the exhaust manifold 68. A pressure wave generated by the expanding exhaust gases exiting the exhaust port travels along the exhaust system 12 and a fresh charge is drawn into the combustion chamber. A reflected pressure wave is produced by the water trap 138, returns to the exhaust port, and acts as a plug keeping the fresh charge in the combustion chamber from leaking through the exhaust port into the exhaust manifold 68 prior to combustion. A similar reflected pressure wave is also produced by the converging lower section 114 of the expansion chamber 90.

An aspect of the present invention involves using the reflected pressure wave to carry atomized and/or vaporized water upstream through the catalyzer 104 to cool the catalyzer 104. This effect is achieved by controlling parameters such as the distance along the exhaust passage between the cylinder exhaust ports and the front of the catalyzer 104 and the distance from the rear of the catalyzer 104 to the coolant-exhaust merge point 131. In a preferred embodiment, the length of the exhaust passage from both exhaust ports to the front end of the catalyzer 104 is 780 millimeters; the length of the exhaust passage between the rear end of the catalyzer and the coolant-exhaust merge point 131 is 200 millimeters. In this arrangement, the pressure wave reflects off the watertrap 138. The reflected return wave reverses the flow of a portion of the exhaust/cooling water mixture from the merge point 131, carrying the mixture upstream and across the catalyzer 104, thus cooling the catalyzer 104.

When cooling water from the water jacket 96 mixes with exhaust gases at the coolant-exhaust merge point 131, the water absorbs energy from the hot exhaust gases and a portion of the water may be vaporized. Thus, the exhaust gases are cooled by being mixed with the water. When the cooled exhaust/water mixture is pulled upstream over the catalyzer 104 by the reflected return wave, this cooled mixture cools the catalyzer 104. Also, a portion of the cooling water may not have been vaporized at the merge point 131. This unvaporized water may become vaporized upon contact with the catalyst bed 108, thereby drawing energy from the catalyst bed 108 and cooling it in the same manner as the water cools the exhaust gases at the merge point 131.

The volume of water entering the exhaust passage at the merge point 131 is limited so that there is not enough water entering to constitute a risk of a sudden rush of relatively cold water into the catalyzer, resulting in possible cracking or shattering of the catalyzer 104. Because the water volume is limited, damage to the catalyzer 104 will be avoided.

Those skilled in the art will appreciate that as the size and shape of the exhaust passage, the position of the water trap 138 and/or the size and shape of the expansion chamber 90 are varied, corresponding adjustments must be made in the lengths between the exhaust ports and the front of the catalyzer 104 and from the rear of the catalyzer 104 to the coolant-exhaust merge point 131 in order to facilitate exhaust/coolant mixture flow reversal with the reflected pressure wave.

As best seen in FIGS. 1, 2 and 4, the above-described components of the exhaust system 12 desirably are arranged within the rear compartment 34 of the watercraft hull 14 to locate the catalyzer 104 near the access opening 35. In the illustrated embodiment, the access opening 35 lies above the engine 35 near the front end of the seat 22.

The access opening 35, as seen in FIG. 2, has a generally rectangular shape. The length of the access opening 35 in the direction parallel to the central longitudinal plane of the hull is longer than the length of the engine 38 in the same direction; however, the access opening 35 is not as wide as the engine and lies in a laterally centered position on the pedestal 29.

As best seen in FIG. 4, the access opening 35 has a sufficiently large size to provide access to the expansion chamber 90. To service or clean the catalyzer 104, a technician can remove the fasteners 118 and move the lower section 114 of the expansion chamber 90 away from the catalyzer. The flexible tube 134 bends during this procedure. The technician can then remove the catalyzer 104 from the expansion chamber 90.

Alternatively, the technician can remove the entire expansion chamber 90 from the rear compartment 34 before servicing or cleaning the catalyzer 104. For this purpose, the access opening 35 desirably has sufficient size through which to pass the expansion chamber 90, as well as a portion of the C-pipe 70. The adjustment mechanisms of the releasably coupling 100, 102 between the C-pipe 70 and the expansion chamber 90 also desirably lie near the access opening 35. In the illustrated embodiment, in fact, these portions of the couplings 100, 102 are positioned above the pedestal 29 to further improve their accessibility. The technician therefore can easily and conveniently service the catalyzer 104.

Figure 7:
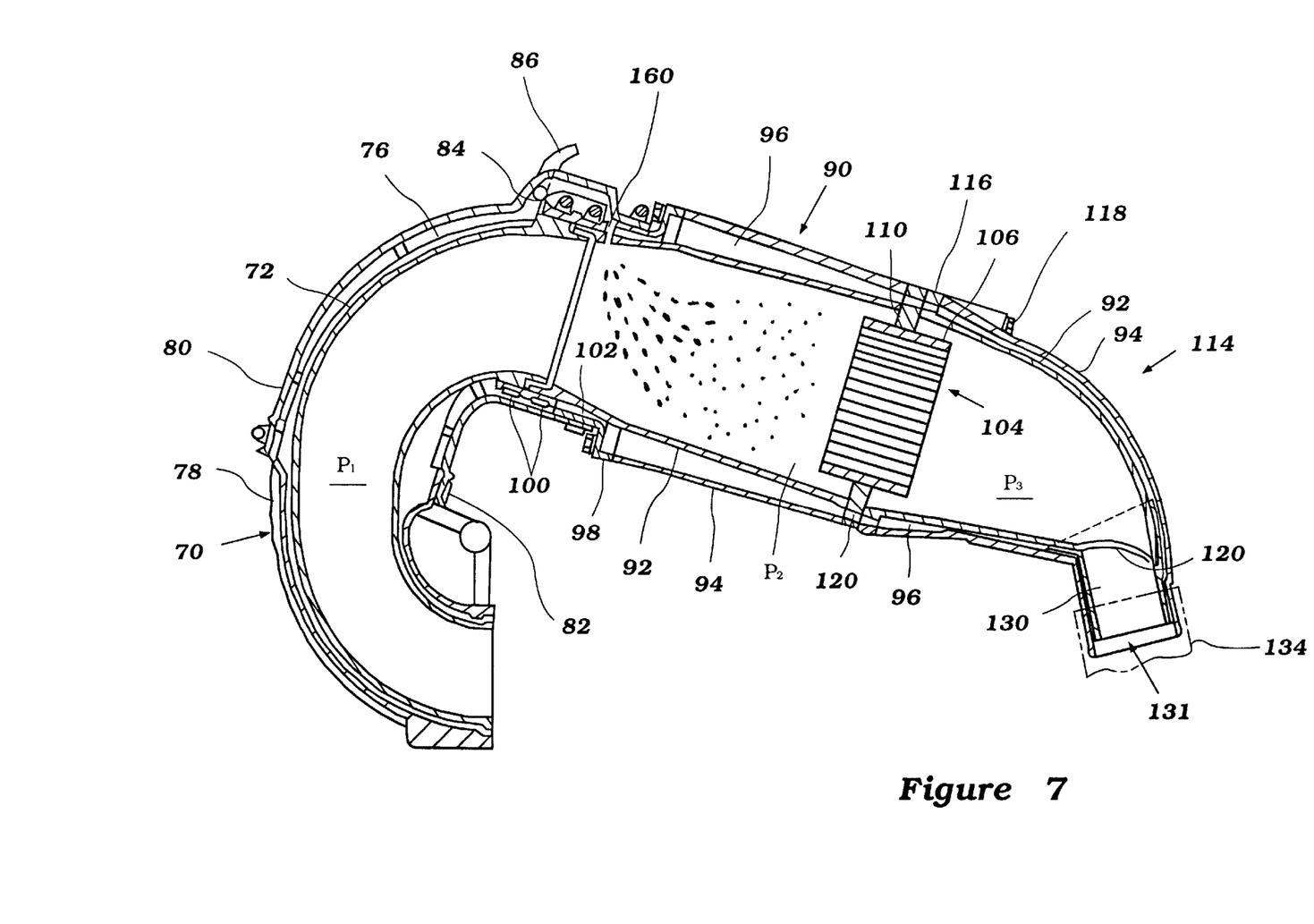
FIG. 7 is an enlarged cross-sectional view taken through another embodiment of an exhaust system having features in accordance with the present invention.

FIG. 7 presents another embodiment of a catalytic exhaust system having features in accordance with the present invention. In this embodiment, many structural parts are identical to those described in the above embodiment. In view of these commonalities, the identical parts have retained the same reference numbers as used above.

In this embodiment, a C-pipe 70 extends from the exhaust manifold 68 and communicates with an expansion chamber 90 having a catalyzer 104 disposed therein as described above. Each of these exhaust pipes have inner and outer shells defining a cooling jacket 76, 96.

A coolant insertion port 160 extends through the inner wall 92 of the expansion chamber 90, defining a passage from the water jacket 96 into the expansion chamber 90 flow passage $P_2$ upstream of the catalyzer 104. The coolant insertion port 160 allows a limited amount of cooling water from the water jacket 96 to enter into the exhaust passage $P_2$ upstream of the catalyzer 104. Because the exhaust gases are at a very high temperature, at least a portion of this water is nearly immediately vaporized, thus cooling the exhaust gases. When the cooled exhaust gases pass through the catalyzer 104, the catalyzer is cooled. Also, remaining water passing through the catalyzer 104 may be vaporized therein, thereby removing energy from the catalyzer 104 and cooling it.

The coolant insertion port 160 may comprise a nozzle for adjusting the cooling water flow. Such a nozzle may inject the cooling water into the flow passage $P_2$ in a fine atomized spray or in a medium spray that facilitates formation of small droplets of water in the exhaust flow passage $P_2$. The flow rate through the port 160 is set, however, so as not to injection of an excessive quantity of relatively cold water that would lead to cracking or shattering damage to the catalyzer 104.

Figure 8:
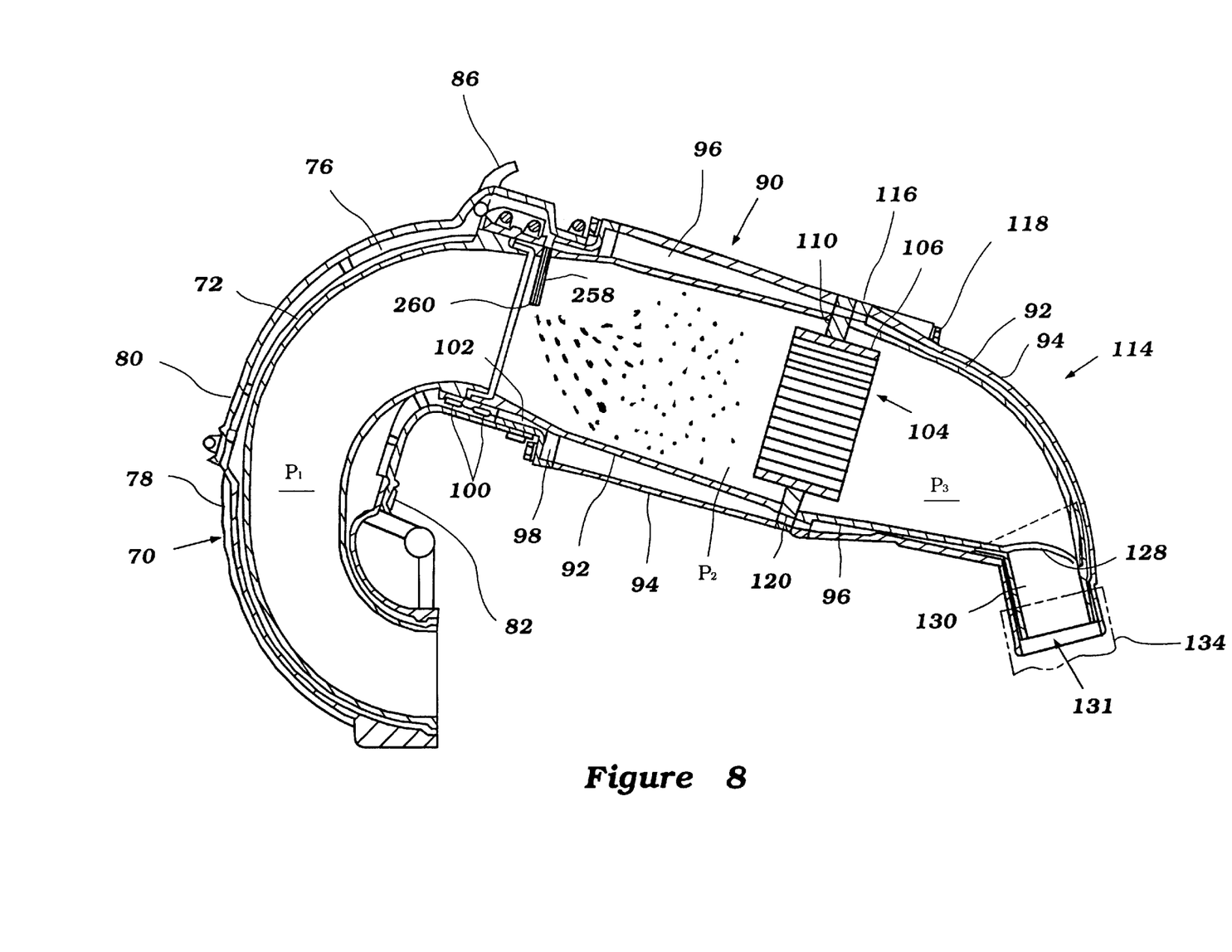
FIG. 8 is an enlarged cross-sectional view taken through the exhaust expansion chamber device of yet another embodiment of an exhaust system having features in accordance with the present invention.

An insertion conduit 258 can also be used with the insertion port, as understood from FIG. 8. FIG. 8 presents an additional embodiment of a catalytic exhaust system having features in accordance with the present invention. This embodiment also shares many structural parts with the embodiments described above; thus, these parts retain the same reference numbers as used above. The insertion conduit 258 is formed extending through the inner shell 92 of the expansion chamber 90 and is in communication with the water jacket 96. The insertion conduit 258 extends away from the inner wall 92 well into the expansion chamber 90 flow passage $P_2$. A coolant insertion port 260 is formed at the end of the insertion conduit 258 in the exhaust flow passage $P_2$.

Because of the high mineral content of saltwater, a watercraft having a coolant insertion port 160 or insertion conduit 258 in accordance with the embodiments is best adapted for use in bodies of fresh water unless an adequate filtration system or alternative source of coolant is provided.

With reference to FIGS. 9 through 12, an additional embodiment of a watercraft with a catalytic exhaust system having features in accordance with the present invention is shown. As above, common elements of this embodiment which share the same structure as elements previously discussed retain the numbers used above.

Figure 9:
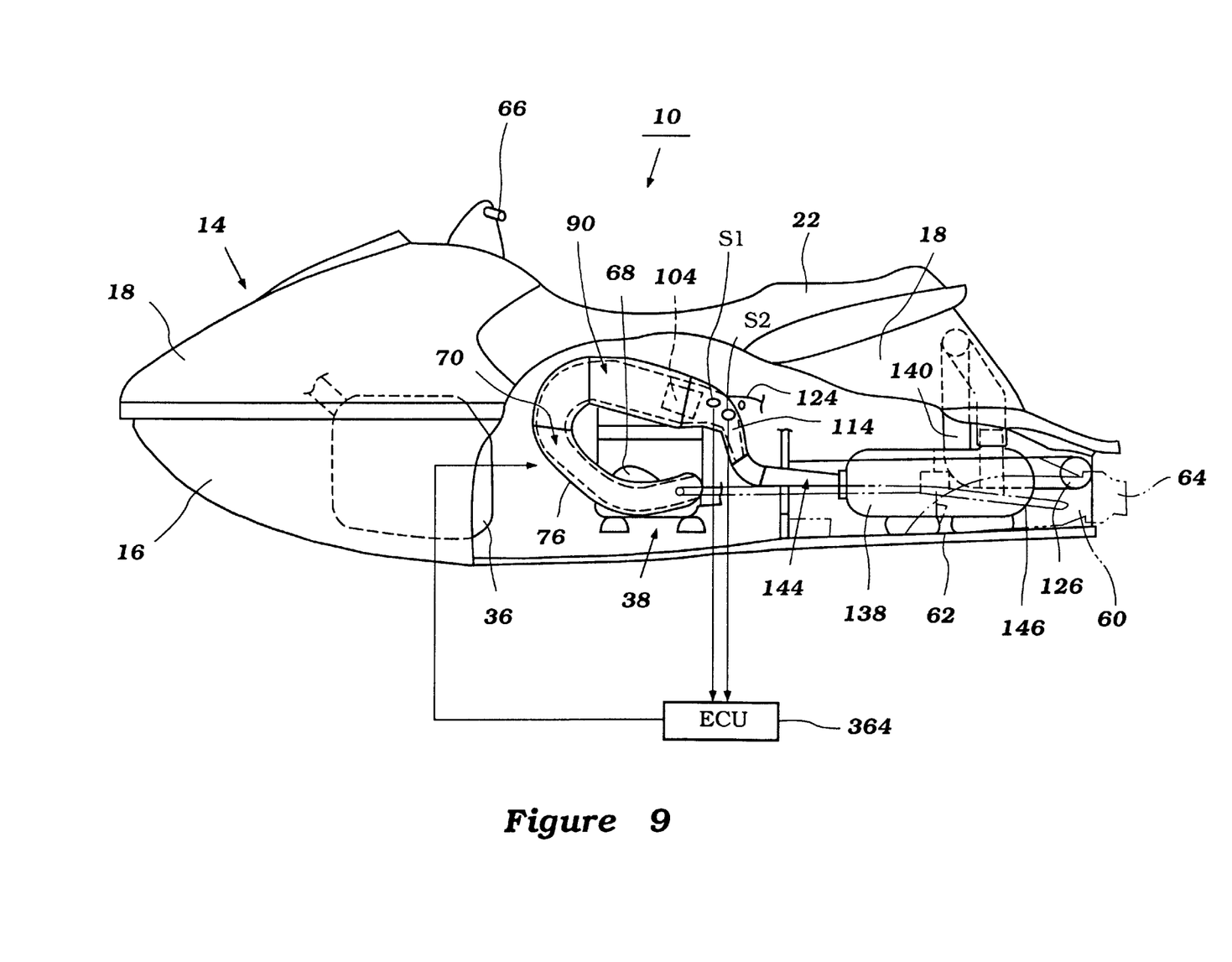
FIG. 9 is a side elevational view, with a portion broken away, of a watercraft having a catalytic exhaust system constructed in accordance with an additional embodiment of the present invention.
Figure 10:
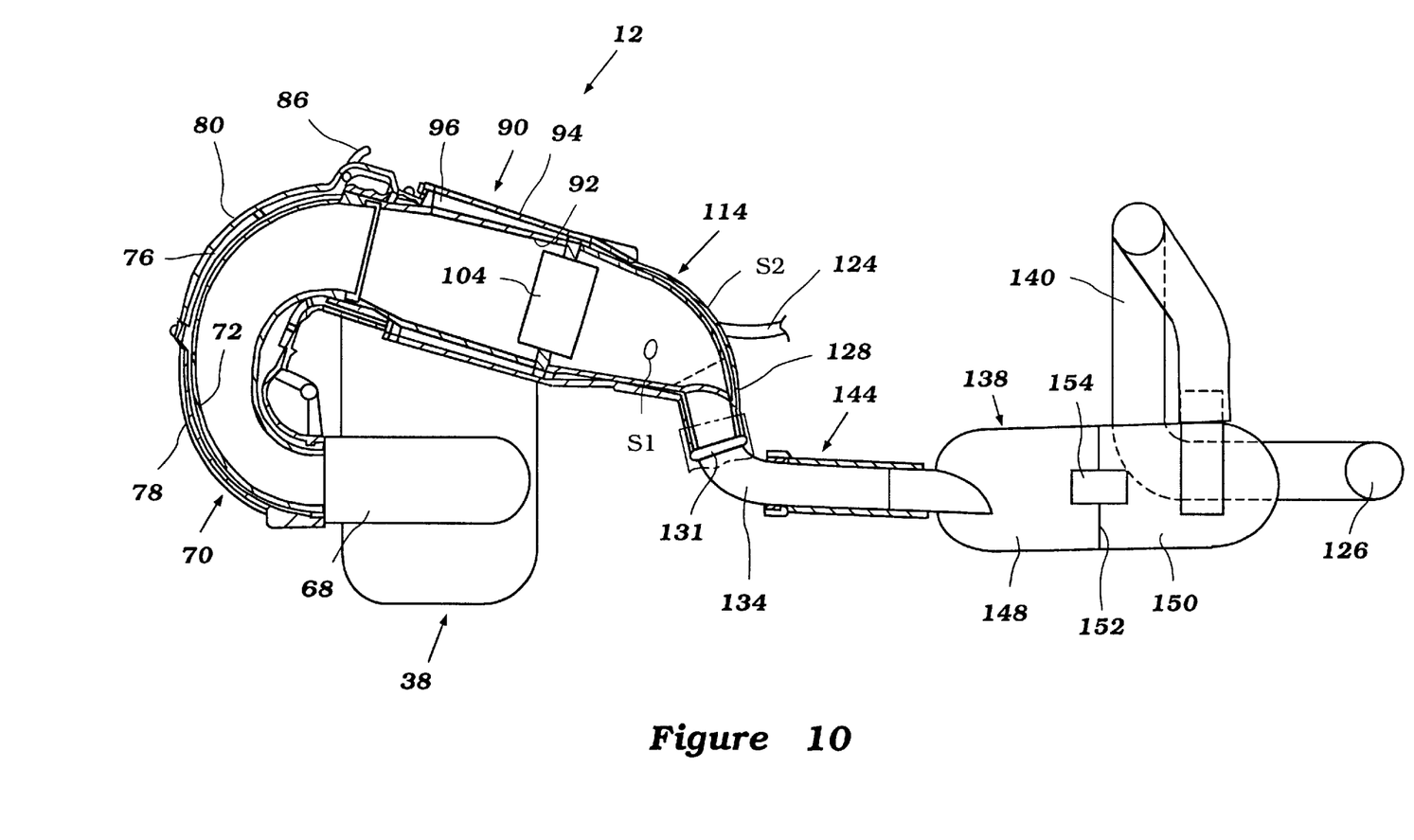
FIG. 10 is a side view, partially in cross-section, of the exhaust system of the watercraft of FIG. 9 in isolation.

As shown in FIGS. 9 and 10, this embodiment includes a watercraft 10 having a hull 14, an engine 38, a propulsion device 60 and an exhaust system 12. Exhaust ports open into an exhaust manifold 68, which leads to an expansion chamber 90 with a catalyzer 104 disposed therein as described above. Cooling jackets 76, 96 are disposed adjacent the exhaust pipes, cooling exhaust gases passing therethrough. A cooling water supply line 146 delivers pressurized water from the jet propulsion unit 60 to the cooling jacket 76.

A water trap device 138 is disposed in the exhaust system 12 downstream of the expansion chamber 90. A flexible pipe 134 extends between the expansion chamber 90 and the water trap device 138, and a rubber sleeve 144 seals the connection therebetween. The water trap device 138 is divided into an upstream compartment 148 and a downstream compartment 150. A dividing wall 152 extends between the compartments 148, 150, and a throttling device 154 is disposed in the dividing wall 152, linking the compartments 148, 150. Exhaust gas exits the water trap device 138 through an upwardly-oriented exhaust pipe 140 which wraps around a tunnel 62 and opens into the tunnel 62 through a discharge end 126 as described above.

Figure 11:
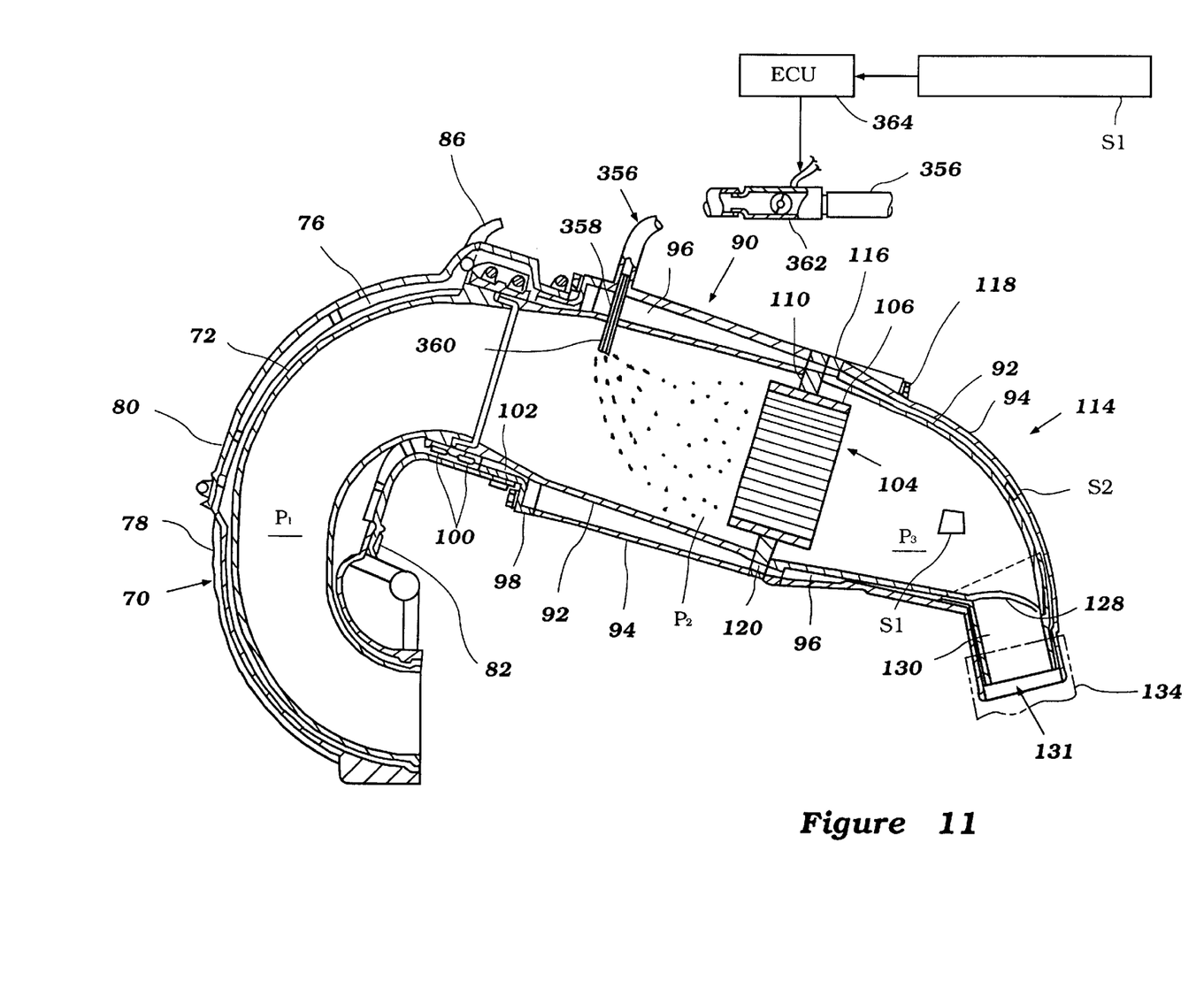
FIG. 11 is an enlarged cross-sectional view taken through the exhaust expansion chamber device of the watercraft of FIG. 9.

With reference to FIG. 11, a delivery conduit 356 is in communication with a source of cooling water such as, for example, pressurized water from the jet propulsion unit 60. An insertion conduit 358 extends through the inner and outer shells 92, 94 of the expansion chamber 90 and is in communication with the delivery conduit 356. A coolant insertion port 360 is disposed on the insertion conduit 358 in a location within the expansion chamber 90 exhaust flow passage $P_2$. Water from the delivery conduit 356 flows through the insertion conduit 358 and the insertion port 360 into the flow passage $P_2$ upstream of the catalyzer 104. As described above, this water cools the exhaust gases and the catalyzer 104.

A control system desirably manages the operation of the engine 38. The control system includes an electronic control unit (ECU) 364 that receives signals from various sensors regarding a variety of engine functions. As part of a catalyst temperature control system, the ECU 364 receives signals from an exhaust gas temperature sensor S1 disposed on the inner wall 92 of the expansion chamber 90 in the exhaust flow passage $P_3$ downstream of the catalyzer 104. The exhaust gas temperature sensor S1 senses the temperature of exhaust gases collected in the flow passage $P_3$. The exhaust gas temperature sensor S1 produces a signal indicative of the sensed exhaust gas temperature and relays this signal to the ECU 364.

A valve 362 is disposed in the delivery conduit 356 in the path of cooling water flowing therethrough. This valve 362 controls the flow of water through the delivery conduit 356. The valve 362 is electronically controlled by the ECU 364. Based upon the information provided by the exhaust gas temperature sensor S1, the ECU 364 opens or closes the valve 362. An alarm temperature (for example, 950° C.) is defined as the exhaust temperature reading corresponding to the maximum desirable catalyzer 104 temperature and is retained in the ECU's 364 memory.

Figure 12:
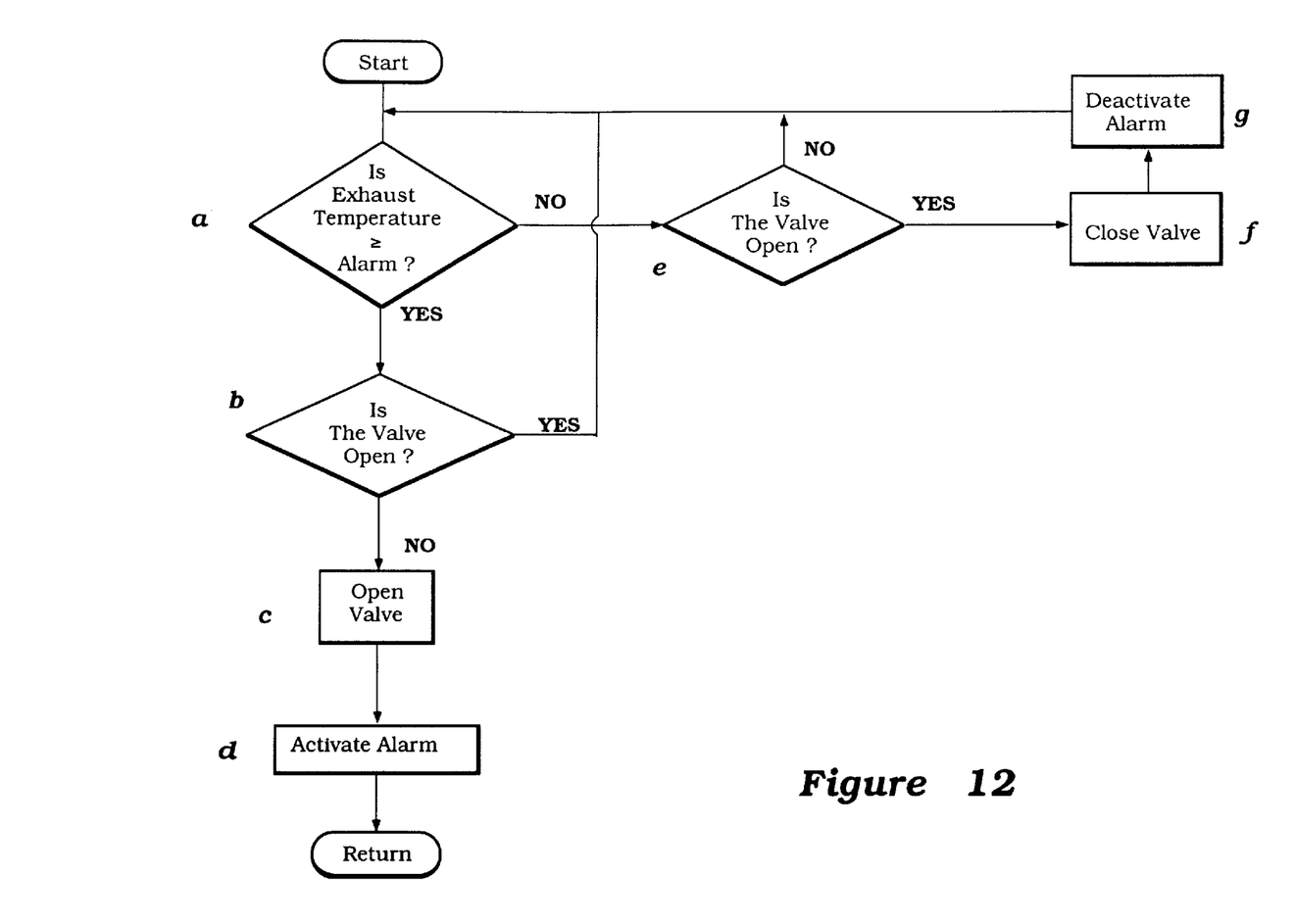
FIG. 12 is a flow chart showing the functional steps performed by the electronic control unit during operation of the exhaust system of the watercraft of FIG. 9.

As shown schematically in FIG. 12, the ECU 364 first determines whether the exhaust gas temperature meets or exceeds the alarm temperature (as represented in decision block "a"). If it does, the ECU 364 next determines whether the valve 362 is already open (as represented in decision block "b"). If the valve 362 is already open, the process returns to the start, but if the valve 362 is closed, the ECU 364 will send a signal to open the valve 362 and activate an alarm, such as a buzzer or flashing LED light (as represented in operation blocks "c" and "d"). So long as the alarm temperature is met or exceeded, the valve 362 remains open and the alarm remains actuated.

When the exhaust gas temperature sensor S1 reads a temperature below the alarm temperature, the ECU 364 determines whether the valve 362 is open (as represented in decision block "e"). If the valve 362 is closed, the process returns to the start, but if the valve 362 is open, the ECU 364 will signal the valve 362 to close and discontinue the alarm (as represented in operation blocks "f" and "g").

A coolant temperature sensor S2 is disposed in the water jacket 96 at a point downstream of the catalyzer 104. The coolant temperature sensor S2 produces a signal indicative of the sensed coolant temperature. Those skilled in the art will appreciate that the ECU 364 may base control of the valve 362 on the information provided by the coolant temperature sensor S2 in a manner similar to the above-described operation based upon the exhaust gas temperature sensor S1. Also, a temperature sensor may be disposed directly on the catalyzer 104 and produce a signal indicative of the temperature thereon. Those skilled in the art will appreciate that the ECU 364 could receive such a signal from such a catalyzer temperature sensor and base control of the valve 362 on the information provided thereby. Similarly, a temperature sensor may be disposed on an exhaust pipe downstream of the catalyzer 104 to sense the temperature of the exhaust pipe itself. As discussed above, operation of the ECU 364 could be based on such a temperature reading.

By cooling the catalyzer 104 when it meets or exceeds the maximum desirable temperature, damage to the catalyzer is prevented and efficient operation of the catalyzer is enhanced.

Although this invention has been described in terms of certain preferred embodiments, other embodiments apparent to those of ordinary skill in the art are also within the scope of this invention. Accordingly, the scope of the invention is intended to be defined only by the claims that follow.

What is claimed is:

1. A watercraft comprising an internal combustion engine having at least one exhaust port and an output shaft, the engine enclosed within a hull of the watercraft, a propulsion device driven by the output shaft, an exhaust system including an exhaust passage that extends between the engine exhaust port and a discharge port, a catalyzer disposed in the exhaust passage to treat exhaust gases from the engine before discharge through the discharge port, and a cooling system including a coolant port opening into the exhaust passage at a point upstream of the catalyzer.

2. A watercraft as in claim 1, wherein the coolant port is configured to dispense atomized water.

3. A watercraft as in claim 1, wherein the exhaust system includes an expansion chamber portion and the catalyzer is disposed in the expansion chamber.

4. A watercraft as in claim 1, wherein the cooling system additionally comprising a cooling jacket extending along at least a portion of the exhaust system.

5. A watercraft as in claim 4, wherein the cooling jacket opens into the exhaust system at a merge point downstream of the catalyst, and at least a portion of coolant flowing through the cooling jacket is introduced into the exhaust system at the merge point.

6. A watercraft as in claim 4, wherein the coolant port is in communication with the coolant jacket.

7. A watercraft as in claim 4, wherein the coolant port is in communication with a coolant supply pipe independent of the cooling jacket.

8. A watercraft as in claim 1, wherein the cooling system additionally includes an electronically controlled valve connected to the coolant port to regulate flow through the coolant port.

9. A watercraft as in claim 8 additionally comprising an electronic control unit connected to a temperature sensor and to the electronically controlled valve, the temperature sensor positioned to sense a temperature associated with the exhaust passage and outputting a signal that is indicative of the sensed temperature to the electronic control unit, the electronic control unit including a memory storing a preset upper temperature limit, and the electronic control unit being configured to compare the sensed temperature with the preset upper temperature limit, the electronic control unit further being configured to output a control signal to open the valve when the sensed temperature is at least as high as the preset upper temperature limit.

10. A watercraft as in claim 9, wherein the electronic control unit additionally is configured to output a control signal to close the valve when the sensed temperature is below the preset upper temperature limit.

11. A watercraft as in claim 9 additionally including an alarm indicator light connected to the electronic control unit, and the electronic control unit is configured to output a signal for the alarm indicator light to flash when the exhaust gas temperature is at least as high as the preset upper temperature limit.

12. A watercraft as in claim 9, wherein the temperature sensor is arranged to sense the temperature of the exhaust gas stream through the exhaust passage.

13. A watercraft as in claim 9, wherein the temperature sensor is arranged to sense the temperature of a cooling jacket that extends along a portion of the exhaust passage.

14. A watercraft as in claim 1 additionally comprising a tunnel having a jet pump disposed therein, and the exhaust passage opens through a side wall of the tunnel, and a sound wall extends from the side wall of the tunnel at a point downstream of the exhaust passage.

15. A watercraft as in claim 14, wherein the jet pump provides coolant to the coolant port.

16. A method for cooling a catalyzer in a watercraft exhaust system, comprising injecting coolant into the exhaust system at a point upstream of the catalyzer.

17. The method of claim 16, further involving atomizing the coolant during its injection into the exhaust system.

18. The method of claim 16, further involving separating the coolant into droplets during its injection into the exhaust system.

19. The method of claim 16, further involving opening an electronic valve in a coolant supply line prior to injecting the coolant into the exhaust system.

20. The method of claim 19, further involving sensing a temperature associated with the exhaust passage, sending a temperature signal to an electronic control unit, and evaluating with the electronic control unit whether the temperature exceeds a preset upper temperature limit prior to opening the valve.

21. A watercraft comprising an internal combustion engine having at least one exhaust port and an output shaft, a propulsion device driven by the engine output shaft, an exhaust system including an exhaust passage that extends between the engine exhaust port and a discharge port, the exhaust system having an expansion chamber portion with a converging portion formed at a downstream end thereof, a catalyzer disposed in the expansion chamber, a water trap device disposed downstream of the catalyzer, a cooling jacket extending along a portion of the exhaust system, the cooling jacket adapted to be connected to a source of coolant and having an opening into the exhaust passage at a coolant-exhaust merge point downstream of the catalyzer, and the catalyzer is sufficiently close to the coolant-exhaust merge point so that an exhaust gas pressure pulse reflecting from downstream of the catalyzer carries at least a portion of the exhaust-coolant mixture from the merge point upstream in the exhaust passage and across the catalyzer.

22. A watercraft as in claim 21, wherein the engine has at least two cylinders, each cylinder having an exhaust port, and the distance along the exhaust passage between the exhaust port and the catalyzer is generally the same for each cylinder.

23. A watercraft as in claim 22, wherein the length of the exhaust pipe from each exhaust port to an upstream side of the catalyst is 780 mm.

24. A watercraft as in claim 21, wherein the volume of coolant entering the exhaust-coolant merge point is such that generally all of the coolant is vaporized by the exhaust heat before being pulled through the catalyzer by the reflecting pressure wave.

25. A watercraft as in claim 24, wherein the length of the exhaust pipe from a downstream side of the catalyst to the merge point is 200 mm.

26. A watercraft as in claim 21 additionally comprising a coolant delivery conduit that delivers coolant from a source to the coolant-exhaust merge point.

27. A watercraft as in claim 26, wherein the coolant delivery conduit comprises the coolant jacket.

28. A watercraft as in claim 21 additionally comprising a coolant port extending into the exhaust passage at a point upstream of the catalyzer, and the coolant port communicates with a source of coolant to inject coolant into the exhaust passage.

* * * * *